United States Patent [19]

Martus et al.

[11] Patent Number: 4,987,968
[45] Date of Patent: Jan. 29, 1991

[54] IN-LINE SOLENOID TRANSMISSION INTERLOCK DEVICE

[75] Inventors: Charles R. Martus, Troy; Charles A. Detweiler, Durand; Gerit V. V. Beneker, Auburn Hills, all of Mich.

[73] Assignee: Lectron Products, Inc., Rochester Hills, Mich.

[21] Appl. No.: 440,414

[22] Filed: Nov. 17, 1989

Related U.S. Application Data

[63] Continuation of Ser. No. 234,074, Aug. 19, 1988, abandoned.

[51] Int. Cl.⁵ ............................................. B60D 1/28
[52] U.S. Cl. ..................................... 180/272; 70/245; 70/248; 70/251; 70/257; 74/502.4; 74/502.5; 74/526; 180/271; 192/4 A; 192/9
[58] Field of Search ........................ 180/271, 272, 278; 70/245, 251, 248, 257; 74/526, 502.4, 502.5; 188/65.1; 192/4 A, 9

[56] References Cited

U.S. PATENT DOCUMENTS

| | | | |
|---|---|---|---|
| 2,156,387 | 5/1939 | Goldfinger | 292/144 |
| 2,871,718 | 2/1959 | Schroeder | 74/502.5 |
| 2,949,989 | 8/1960 | Lindstrom et al. | 192/9 |
| 3,617,081 | 11/1971 | Drucker | 292/252 |
| 4,278,154 | 7/1981 | Cymbal et al. | 192/4 A |
| 4,683,774 | 8/1987 | Memmola | 74/502.4 |
| 4,694,706 | 9/1987 | Lichtenberg et al. | 74/502.4 |
| 4,821,605 | 4/1989 | Martus | 192/4 A |

FOREIGN PATENT DOCUMENTS 2049873 4/1972 Fed. Rep. of Germany ...... 292/144

Primary Examiner—Charles A. Marmor
Assistant Examiner—Eric Culbreth
Attorney, Agent, or Firm—Harness, Dickey & Pierce

[57] ABSTRACT

A transmission shift interlock device which prevents a motor vehicle operator from shifting the automatic transmission shift lever out of the park or neutral position unless some action such as the brake pedal being depressed is taken. The device provides interlock capability by locking the transmission shift cable. An in-line solenoid is provided within the shifter cable having a movable armature which, when energized, forces locking balls or other engagement features into interlocking engagement with the cable core or rod member attached thereto. An alternate embodiment provides an adjustment link for accommodating vehicle tolerance variations and further provides means for having interlock capabilities at more than one shifter position.

14 Claims, 2 Drawing Sheets

IN-LINE SOLENOID TRANSMISSION INTERLOCK DEVICE

This is a continuation of U.S. patent application Ser. No. 234,074, filed Aug. 19, 1988, now abandoned.

BACKGROUND AND SUMMARY OF THE INVENTION

This invention relates to a cable locking device and particularly to an in-line transmission shifter cable locking device for motor vehicle applications.

This invention is directed a design for a shifter interlock device which is particularly adapted for motor vehicles having automatic transmissions which are shifted through an actuation cable. The invention employs an electrically energized solenoid positioned in-line with the cable which forces locking elements into engagement with a cable shaft until some action is taken such as when the vehicle's brake pedal is depressed, thereon the locking elements are permitted to disengage the shaft, thus permitting free movement of the shifter cable. Since most modern vehicles with automatic transmissions use shift cables, the device according to this invention is highly adaptable for use with many motor vehicle models produced by various manufacturers. The present device further restrains movement of the transmission shift cable directly at the transmission shift lever and, therefore, attempts to actuate the shifter while the device is locked does not put extreme loads on the cable. The principal components of the device according to this invention are positioned within the vehicle's occupant compartment where they are protected from the severe outside environment. In accordance with a preferred embodiment of the invention, an adjusting mechanism is provided to accommodate tolerance variations which enables the effective length of the shift cable to be adjusted to provide locking engagement of the device at the desired shifter position.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Figure 1:
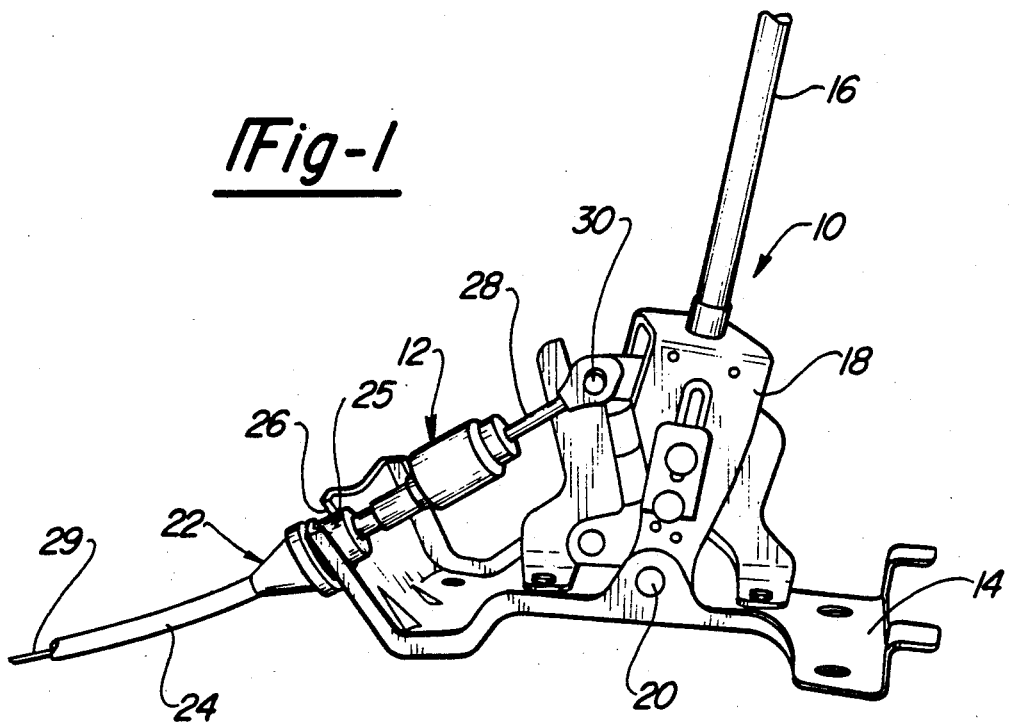
FIG. 1 is a pictorial view of a shifter assembly of an illustrative motor vehicle showing a transmission shifter lever coupled to a transmission shift cable assembly incorporating the in-line solenoid transmission interlock device according to this invention.

FIG. 1 illustrates a motor vehicle automatic transmission shifter assembly 10 with an in-line solenoid transmission interlock device 12 coupled thereto in accordance with this invention. Shifter assembly 10 includes mounting plate 14 for mounting the device to the floor pan of a motor vehicle. Shifter lever 16 is pivotable through a limited angular range with various angular positions corresponding to a particular transmission gear selection. Shifter lever 16 is mounted to clevis 18 which is pinned for rotation with respect to plate 14 by clevis pin 20.

Transmission shift cable assembly 22 includes an outer sheath 24 with an end fitting 25 which is supported by plate 14 at restraining notch 26. Shift cable rod 28 attached to an end of cable core 29 is affixed to clevis 18 via pin 30 such that arcuate motion of shifter lever 16 causes the rod to be moved into and out of outer sheath 24, as shown by the full and phantom line positions in FIG. 2. Shifter assembly 10 would further include (not shown) some means for indicating to the operator the transmission selection position which shifter lever 16 is set at. Such indicia can be provided, for example, in the form of a labeled elongated slot through which shifter lever 16 passes, or through a remotely actuated shift indicator device which are well known according to the prior art. The opposite end of cable assembly 22 (not shown) is coupled to the vehicle's automatic transmission. At the transmission, a bracket is provided which restrains outer sheath 24 whereas cable inner core 29 engages a transmission shift actuating lever.

Figure 2:
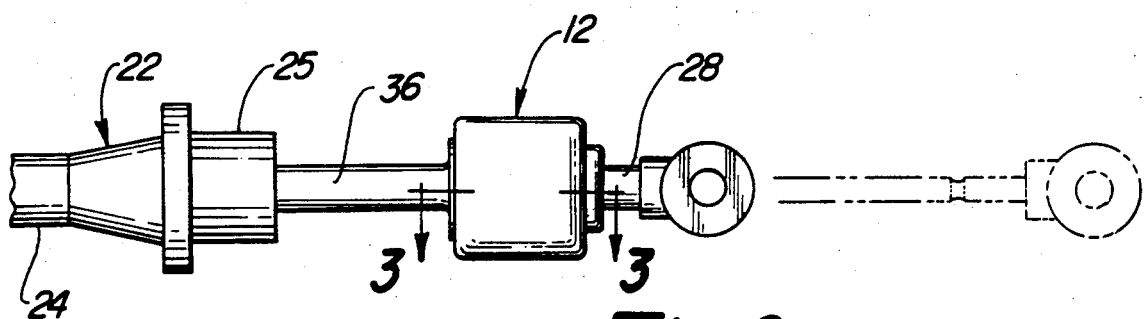
FIG. 2 is a side elevational view of the end of the in-line solenoid transmission interlock device shown in FIG. 1.
Figure 3:
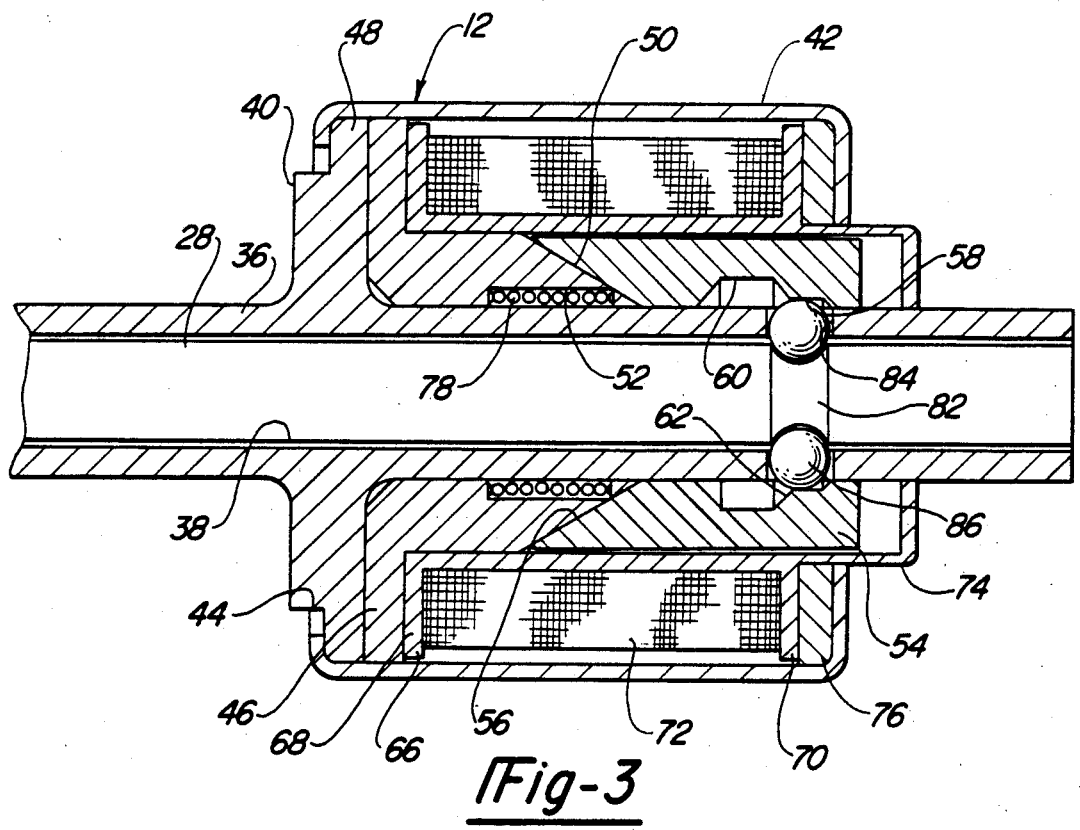
FIG. 3 is a longitudinal cross-sectional view taken along line 3—3 of FIG. 2 particularly showing details of the internal components of the solenoid device.

In accordance with a principal feature of this invention, cable assembly 22 includes solenoid device 12 which provides the interlock function such that rod 28 is restrained at a particular position with respect to cable outer sheath 24 until the device is released. With particular reference to FIGS. 2 and 3, the components making up solenoid device 12 are shown. Rod guide 36 defines elongated internal bore 38 through which shifter rod 28 is longitudinally movable. Rod guide 36 further forms a radially extending circular flange 40 which forms a point of support for the remainder of solenoid 12. Cylindrical housing 42 encloses solenoid 12 and is mounted to flange 40 at rolled over edge 44. Pole piece 46 is fixedly mounted within housing 42 and encircles rod guide 36. Pole piece 46 further defines a radially extending flange 48 which acts as a flux collector at one of its axial ends, and forms a convex frusto-conical surface 50 at its opposite end. Counterbore 52 is formed within pole piece 46 at its end adjacent surface 50.

Armature 54 is movable in an axial direction through a limited range of motion along rod guide 36 and includes a concave frusto-conical surface 56 which corresponds in shape to that of pole piece surface 50. Armature 54 further defines a pair of annular grooves 58 and 60 with groove 60 being deeper in a radial direction than groove 58 and having a conical ramp surface 62 joining the grooves. Coil bobbin 66 encircles pole piece 46 and armature 54, and forms a pair of axially separated flanges 68 and 70 which confine and support coil winding 72. Bobbin 66 further forms an end cup 74 which encloses one end of armature 54 but permits a limited range of longitudinal motion of the armature. Flux collector ring 76 is positioned adjacent flange 70. Return spring 78 is disposed within counterbore 52 and biases armature 54 away from pole piece 46.

At one or more axial positions along shifter rod 28, an inwardly formed annular groove 82 is provided. One or more radial holes 84 is provided through rod guide 36 at a position aligned with groove 82 when the transmission is set in the park position. Balls 86 are loaded into holes 84 and provide a locking function as will be described hereinafter.

FIG. 3 illustrates the orientation and cooperation of elements of interlock solenoid 12 when winding 72 is energized which causes the transmission to be locked in the park position. As shown, armature 54 is drawn toward pole piece 46 caused by the induced magnetic field from winding 72. The tapered working air gap provided by the frusto-conical surfaces 50 and 56 provide a desired level of attractive force of armature 54 over a fairly long stroke distance of the armature. However, alternately shaped Working air gaps such as planar air gaps could also be used. In the position shown in FIG. 3, balls 86 are forced in a radially inward direction through engagement with ramp surface 62 and groove 58 such that they interlockingly engage with rod groove 82. In this condition, the vehicle operator is prevented from moving shifter lever 16 to cause rod 28 to move longitudinally within guide 36. If, however, electric current is interrupted to winding 72 caused, for example, by the operator depressing the vehicle's brake pedal, the magnetic attraction between pole piece 46 and armature 54 is relieved and the biasing force of spring 78 moves the armature 54 away from the pole piece. Once armature 54 is fully extended away from pole piece 46, balls 86 are permitted to move radially outward to seat within groove 60, thus no longer interlockingly engaging rod groove 82.

Figure 4:
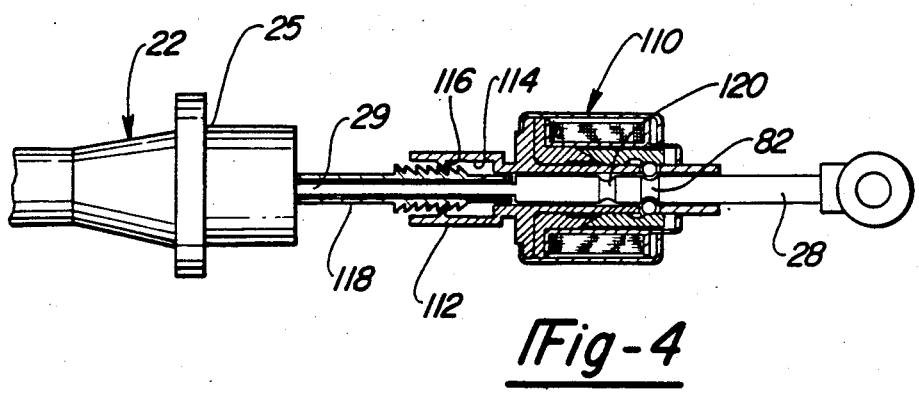
FIG. 4 is a longitudinal cross-sectional view of an in-line solenoid transmission interlock device according to a second embodiment of this invention incorporating a self-adjusting mechanism and dual position locking capability.

FIG. 4 illustrates a second embodiment of a solenoid interlock device 110 in accordance with this invention. Elements of device 110 which are identical to those previously described in connection with the first embodiment are identified by like reference numbers. For this embodiment, solenoid interlock device 110 is substantially identical to that shown in FIG. 3 except that a modified rod guide 112 is provided which acts as an adjustment link. Rod guide 112 forms an enlarged cavity 114 having inwardly directed teeth 116 therein. Cable outer sheath 24 includes a ribbed or toothed plunger 118 interfitting within cavity 114. The teeth 116 and plunger 118 interact so that the plunger can be inserted at various depths within cavity 114 but is restrained from being withdrawn. The function of modified rod guide 112 and plunger 118 is to provide a means for adjusting the effective length of outer sheath 24 to accommodate tolerance variations in the vehicle and cable assemblies. In use, solenoid device 110 is positioned for engagement of locking balls 86 with groove 82. The transmission shift lever (not shown) is placed in the park position and the opposite end of the cable is mounted. Due to tension between cable core 29 and outer sheath 24 plunger 118 is forced within cavity 114 to the proper position.

Modified solenoid device 110 as shown in FIG. 4 further incorporates an additional locking groove 120 which enables interlock device 110 to lock at two positions, thus enabling the manufacturer to provide interlock capability operable at either the neutral or park transmission selector positions.

While the above description constitutes the preferred embodiments of the present invention, it will be appreciated that the invention is susceptible to modification, variation and change without departing from the proper scope and fair meaning of the accompanying claims.

What is claimed is:

1. A cable locking device for a cable assembly having an outer sheath with an axially movable inner core, said locking device selectively permitting or restraining axial movement of said inner core, comprising:

a rod connected at one end to said inner core and at an opposite end to means for generating axial movement of said inner core, said rod having at least one annular groove, a pole piece surrounding said rod, an armature surrounding said rod and axially movable between a first position displaced from said pole piece to a second position attracted toward said pole piece, a solenoid winding surrounding said pole piece and said armature and urging said armature toward one of said first or said second positions when energized, rod locking means operatively associated with said armature for interlockingly engaging said groove in said rod to inhibit axial movement of said rod when said armature is in one of said positions and disengaging said groove in said rod to permit said axial movement when said armature is in the other of said positions.

2. A cable locking device according to claim 1 wherein said armature has an inside groove formed therein and said rod locking means comprises at least one ball element engaging said inside groove of said armature to urge said ball into engagement with said groove on said rod to inhibit axial movement thereof.

3. A cable locking device according to claim 2 wherein said movable portion of said rod has two annular grooves enabling said rod to be inhibited from axial movement at two distinct axial positions.

4. A cable locking device according to claim 1 wherein said rod locking means inhibits axial movement of said rod when said solenoid winding is energized.

5. A cable locking device according to claim 4 further comprising spring means urging said armature to said first position.

6. A cable locking device according to claim 1 further comprising cable length adjustment means including a rod guide having an adjustable link with an enlarged cavity having a first set of inwardly directed engagement members affixed therein and a second set of outwardly directed engagement members affixed to said cable sheath, said engagement members enabling the collapsing of said adjustment link but inhibiting expansion of said link.

7. An in-line automatic transmission shifter interlock device for a motor vehicle of the type having a cable assembly with an outer sheath and an axially movable inner core therein, with said inner core coupled at opposite ends to said interlock device and the transmission of said vehicle, said interlock device selectively permitting or restraining movement of a transmission shifter lever, comprising:

a rod connected at one end to said inner core and at an opposite end to said shift lever, said rod having at least one rod groove, a tubular rod guide encircling said rod and guiding said rod for axial movement, said rod guide having at least one hole extending therethrough, a pole piece encircling said rod guide, an armature encircling said rod guide and axially movable between a first position displaced from said pole piece and a second position attracted toward said pole piece, said armature having an armature groove communicating with said hole in said rod guide, a solenoid winding encircling said pole piece and said armature and urging said armature toward said second position when energized, biasing means for urging said armature toward said first position, and rod locking means disposed within said hole in said rod guide and operatively associated with said armature groove for selectively inhibiting or permitting axial movement of said rod such that when said armature is in said second position it activates said rod locking means to engage said rod to inhibit axial movement thereof and when said armature is in said first position it de-activates said rod locking means to disengage from said rod to permit axial movement thereof.

8. An in-line automatic transmission shifter interlock device according to claim 7 wherein said armature groove defines a first and second groove joined by a ramp surface with said second grooves being radially deeper than said first groove, said rod locking means comprises at least one ball disposed within said rod guide hole and in rolling contact with said armature groove, said first groove urging said ball into engagement with said rod groove to inhibit axial movement of said rod and said second groove permitting said ball to disengage said rod groove to permit axial movement of said rod.

9. An in-line automatic transmission shifter interlock device according to claim 8 wherein said rod has two rod grooves enabling said rod to be inhibited from axial movement at two distinct axial position.

10. An in-line automatic transmission shifter interlock device according to claim 7 further comprising cable length adjustment means including said rod guide having an adjustable link with an enlarged cavity having a first set of inwardly directed engagement members affixed therein and a second set of outwardly directed engagement members affixed to said cable sheath, said engagement members enabling the collapsing of said adjustment link but inhibiting expansion of said link.

11. An automatic transmission cable assembly having an in-line solenoid interlock device, said cable assembly coupling the transmission of a vehicle to an operator actuated shift lever for selectively permitting or restraining said operator from actuating said shift lever, comprising:

an axially movable elongated core member coupled at one end to said transmission;

an outer sheath encircling said core member;

rod means for connecting an opposite end of said core member to said shift lever, said rod means having at least one annular groove provided thereon;

a solenoid device coaxially surrounding said rod means and having a pole piece and an armature encircling said rod means, said armature axially movable between a first position displaced from said pole piece to a second position attracted toward said pole piece, said armature defining a generally step-like inside groove adjacent said rod means defining first and second groove surfaces, said solenoid device further including a solenoid winding surrounding said pole piece and said armature for urging said armature toward said second position when energized, and bias means for urging said armature toward said first position; and rod locking means disposed between said step-like groove on said armature and said rod means for inhibiting axial movement of said rod means when said armature is in one of said positions and permitting said axial movement when said armature is in the other of said positions, said first groove surface of said step-like armature groove urging said rod locking means to interlockingly engage said groove in said rod means so as to inhibit axial movement of said rod means when said armature is in one of said positions and said second groove surface of said step-like armature groove permitting said rod locking means to releasably disengage said groove in said rod means so as to permit axial movement of said rod means when said armature is in the other of said positions.

12. An automatic transmission cable assembly according to claim 11, wherein said rod locking means comprises at least one spherical ball element disposed between and concurrently engaging one of said first and second groove surfaces of said step-like armature groove and said rod means.

13. An automatic transmission cable assembly according to claim 12 wherein said rod means comprises two of said annular grooves, each of said annular grooves permitting said shift lever to be selectively restrained from actuation in at least two distinct positions.

14. An automatic transmission cable assembly according to claim 12 further comprising a tubular rod guide coaxially disposed between said rod means and said pole member and armature for guiding said rod means for axial movement therein, said rod guide defining at least one hole extending therethrough for interconnecting said armature groove and said rod means, said hole acting to retain said spherical ball therein.

* * * * *